United States Patent [19]
Morita

[11] Patent Number: 5,731,906
[45] Date of Patent: Mar. 24, 1998

[54] GRADIENT INDEX OPTICAL ELEMENT

[75] Inventor: Yuko Morita, Hachiohji, Japan

[73] Assignee: Olympus Optical Co., Ltd., Tokyo, Japan

[21] Appl. No.: 729,415

[22] Filed: Oct. 11, 1996

Related U.S. Application Data

[63] Continuation-in-part of Ser. No. 504,263, Jul. 19, 1995, abandoned, which is a continuation-in-part of Ser. No. 151,371, Nov. 12, 1993, abandoned.

[30] Foreign Application Priority Data

Nov. 13, 1992 [JP] Japan .................................. 4-328737

[51] Int. Cl.$^6$ ...................................... G02B 3/00
[52] U.S. Cl. ...................................... 359/652; 359/654
[58] Field of Search ...................................... 359/652, 653, 359/654

[56] References Cited

U.S. PATENT DOCUMENTS

| | | | |
|---|---|---|---|
| 5,166,827 | 11/1992 | Noda | 359/652 |
| 5,171,344 | 12/1992 | Noda | 385/124 |
| 5,349,473 | 9/1994 | Kurasawa | 359/654 |
| 5,416,863 | 5/1995 | Vengsarkar | 359/653 |

OTHER PUBLICATIONS

Hideo Kita et al, "Light-Focusing Glass Fibers and Rods", Journ. of the Amer. Ceramic Soc., vol. 54, No. 7 Jul. 1971, pp. 321–326.

S. Ohmi et al, "Gradient-index rod lens made by a double ion-exchange process", Applied Optics, vol. 27 No. 3, 1 Feb. 1988, pp. 496–499.

Masayuki Yamane, "Gradient-index Glass Rods of . . . System Prepared by the Sol-Gel Process", Journ. of Non-Crystalline Solids–100, (1988), pp. 506–510.

"R–Grin . . . Glass Rods Prepared by a Sol–Gel Method", Electronics Letters 9th Oct. 1986 vol. 22 No. 21, pp. 1108–1109.

"Radial Gradient Refractive-Index Glass Rods Prepared by a Sol-Gel Method", Electronics Letters 16th Jan. 1986 vol. 22 No. 2 pp. 99–100.

*Primary Examiner*—Scott J. Sugarman
*Attorney, Agent, or Firm*—Cushman Darby & Cushman IP Group of Pillsbury Madison & Sutro LLP

[57] ABSTRACT

At least one metal species g is selected from the metal group G consisting of Nb, Ta, Pb, Ti, Tl and Zr. At least one metal species f is selected from the metal group F1 consisting of La, In, Y, Zr and Ta. The metal species g and f are not simultaneously Ta or Zr. The metal species g and f have concentrations distributed in mutually reverse directions. The element exhibits a ratio of dCf/dCg, in which dCf and dCg represent concentration distribution gradients of metal species f and g, respectively, ranging from −4 to −0.2. Alternatively, at least one metal species f may be selected from the metal group F2 consisting of Ga, Sn, Ba, Sr and Ca, while causing the ratio of dCf/dCg to be in the range of from −7 to −0.5. Thus, a gradient index optical element is obtained, which exhibits less refractive index change and large Abbe number change and is hence superior to conventional elements in correction of chromatic aberration.

15 Claims, 2 Drawing Sheets

METAL OXIDE CONTENT

METAL OXIDE CONTENT

METAL OXIDE CONTENT

METAL OXIDE CONTENT

METAL OXIDE CONTENT

METAL OXIDE CONTENT

GRADIENT INDEX OPTICAL ELEMENT

This application is a continuation-in-part of application Ser. No. 08/504,263, filed Jul. 19, 1995, which was abandoned upon the filing thereof, and which was a continuation-in-part of application Ser. No. 08/151,371, filed Nov. 12, 1993, now abandoned.

BACKGROUND OF THE INVENTION

1. Field of the Invention

The present invention relates to a gradient index optical element. More particularly, the present invention is concerned with a gradient index optical element in which a specific metal species and another specific metal species have concentrations distributed in mutually reverse directions at a specific gradient ratio. This gradient index optical element finds applications in various optical fields. In particular, it is advantageously used as an optical lens in a camera, a microscope and other optical instruments.

2. Discussion of Related Art

The gradient index optical element is characterized in that the medium thereof is provided with a refractive index distribution so that the medium per se has a power, refracting power. The power depends on the refractive index distribution, and can be increased by increasing the absolute value of the refractive index difference ($\Delta n$) between the center and the periphery of the optical element.

Various proposals for increasing the absolute value of the refractive index difference ($|\Delta n|$) have been made by many researchers. For example, according to Journal of the American Chemical Society Vol. 54, No. 7 (1971), pp 321-, the optical element commercially available as SELFOC lens (registered trademark) was provided with a Tl concentration gradient by ion exchange technology so that it exhibited a large value of $|\Delta n|$. Further, a lens exhibiting a $|\Delta n|$ value as large as approximately 0.059 was obtained by providing an Ag concentration gradient by double ion exchange technology (see Applied Optics Vol. 27, No. 3 (1988), pp 496-). Still further, a lens exhibiting a $|\Delta n|$ value as large as approximately 0.04 was obtained by providing Pb and K concentration gradients (see J. Non-cry. sol. 100, 506, (1988)), and a lens exhibiting a $|\Delta n|$ value as large as approximately 0.03 was obtained by providing a Ti or Ge concentration gradient (see Elect. lett. 22, 99 and 1108 (1986)), by the sol-gel process.

Moreover, U.S. Pat. No. 5,166,827 (Japanese Patent Application Laid-Open Specification No. 141302/1991) disclosed a composition of a gradient index optical element (GRIN) whose Abbe number increased with an increase in the refractive index, said composition having been developed by noting variation of distribution characteristics by metal species combinations.

On the other hand, miniaturization of a high performance zoom lens as an example of optical design effectively utilizing a gradient index optical element was disclosed in Japanese Patent Application Laid-Open Specification No. 17609/1991. In the specification, there is a description to the effect that a desirable optical element exhibits refractive index and Abbe number changes as indicated by lines designated $D_1$ DIRECTION and $D_2$ DIRECTION on the $n_d$-$v_d$ diagram of FIG. 2, that is, exhibits a less refractive index change but a large Abbe number change.

In the gradient index optical element, if all metal elements are present in the form of an oxide in a glass, the refractive index gradient is provided by a gradient of metal oxide concentration. Thus, the optical characteristics of the glass depend on the proportion of metal oxides. In the case of a glass comprising $SiO_2$ as a main component, since metal oxides cause the glass to have larger values of refractive index and dispersion (smaller Abbe number), any trials to obtain a gradient index optical element by providing such metals with a concentration gradient inevitably lead to refractive index and Abbe number changes as indicated by line designated B DIRECTION on the $n_d$-$v_d$ diagram of FIG. 2.

U.S. Pat. No. 5,166,827 described that the distribution characteristics of a gradient index optical element could be varied by introducing a plurality of metals in a manner such that they had concentrations distributed in mutually reverse directions. However, all metal species combinations described therein exhibit refractive index and Abbe number changes as indicated by line designated A DIRECTION on the $n_d$-$v_d$ diagram of FIG. 2.

Therefore, although an optical element exhibiting refractive index and Abbe number changes as indicated by lines designated $D_1$ DIRECTION and $D_2$ DIRECTION on the $n_d$-$v_d$ diagram of FIG. 2, is desired from the viewpoint of optical design as suggested in Japanese Patent Application Laid-Open Specification No. 17609/1991, particular metal oxide combinations and distributions have not yet been found for obtaining such a desired optical element. That is, although various optical design examples utilizing a potential characteristic of a gradient index optical element have been shown, no gradient index optical element having optical properties as desired from the viewpoint of such an optical design has been developed.

SUMMARY OF THE INVENTION

The present invention has been made to solve the problem of the prior art.

It is, therefore, an object of the present invention to provide a gradient index optical element exhibiting a less refractive index change but a large Abbe number change so that it is improved in correcting chromatic aberration.

The foregoing and other objects, features and advantages of the present invention will become apparent from the following detailed description and appended claims taken in connection with the accompanying drawings.

DETAILED DESCRIPTION OF THE INVENTION

According to the present invention, in order to attain the above object of the present invention, there is provided a gradient index optical element comprising at least one metal species g selected from the metal group G consisting of Nb, Ta, Pb, Ti, Tl and Zr and at least one metal species f selected from the metal group F1 consisting of La, In, Y, Zr and Ta, the metal species g and f being not simultaneously Ta or Zr, the metal species g and f having concentrations distributed in mutually reverse directions, wherein the element in its entirety or portion exhibits a ratio of dCf/dCg (ΔCf/ΔCg in FIG. 1), in which dCf and dCg represent concentration distribution gradients of metal species f and g, respectively, ranging from −4 to −0.2.

Further, there is provided a gradient index optical element comprising at least one metal species g selected from the metal group G consisting of Nb, Ta, Pb, Ti, Tl and Zr and at least one metal species f selected from the metal group F2 consisting of Ga, Sn, Ba, Sr and Ca, the metal species g and f having concentrations distributed in mutually reverse directions, wherein the element in its entirety or portion exhibits a ratio of dCf/dCg (ΔCf/ΔCg in FIG. 1), as defined above, ranging from −7 to −0.5.

The terminology "concentration distribution gradient" used herein means the molar concentration variation in terms of metal oxide per length. In general, the concentration distribution gradient is determined in a differential manner on the basis of the molar concentration variation per interval along a radial direction.

The ratio of concentration distribution gradients, dCf/dCg, is obtained by dividing the above concentration distribution gradient for metal species f by the above concentration distribution gradient for metal species g.

Figure 1:
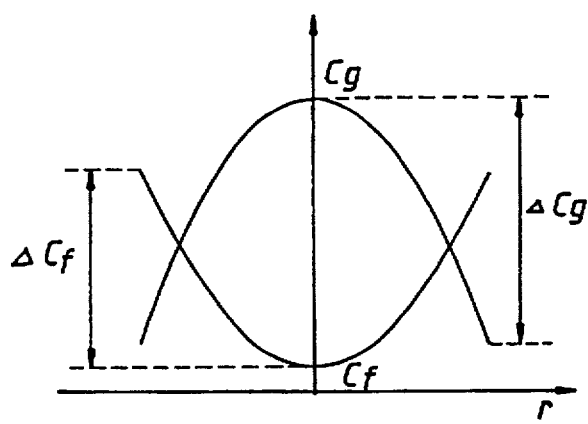
FIG. 1(a) and (b) are conceptual diagrams each showing distributions of metal oxide contents in a gradient index optical element according to the present invention.
Figure 1:
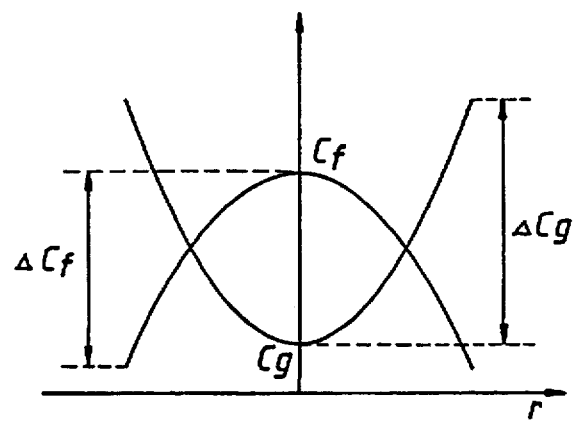
Figure 3:
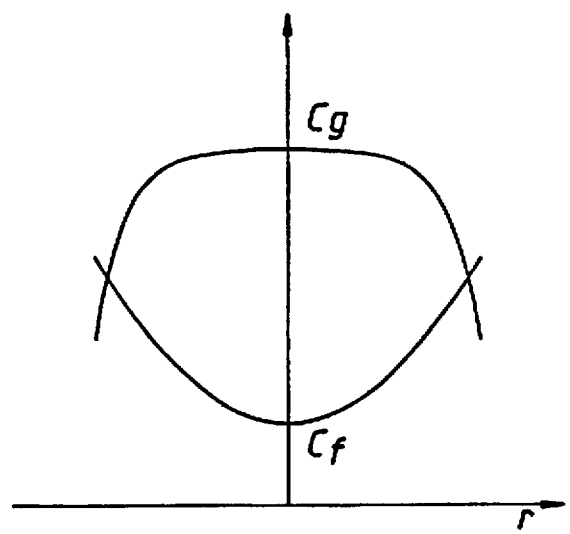
FIG. 3 is a conceptual diagram showing a nonparabolic distribution of metal oxide contents in a gradient index optical element.
Figure 4:
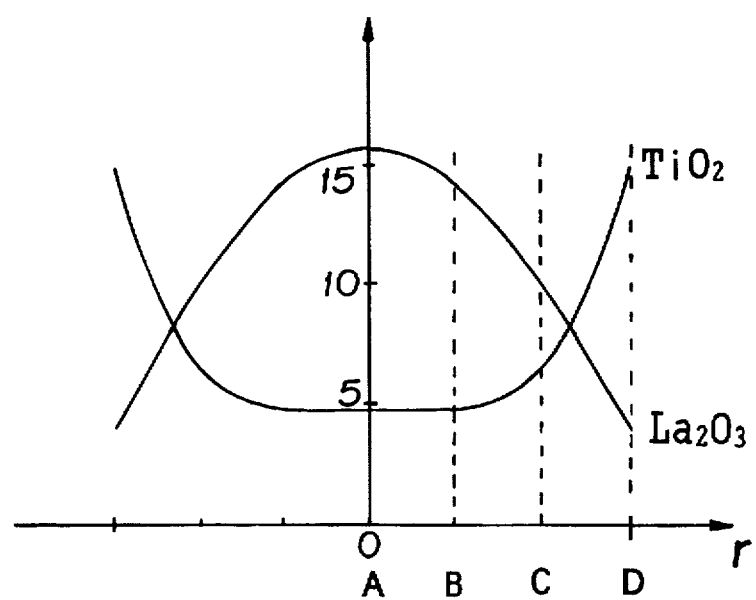
FIG. 4 is a conceptual diagram showing another nonparabolic distribution of metal oxide contents in a gradient index optical element.

Further description will be made below with respect to the ratio of concentration distribution gradients. In particular, in a gradient index optical element comprising metal oxides g and f each having concentrations parabolically distributed along a radial direction, the metal oxide content at the periphery minus that at the center per length of the radius of the optical element can be taken as the concentration distribution gradient for each of the metal oxides g and f (dCg and dCf). From these concentration distribution gradients, the ratio dCf/dCg is calculated. On the other hand, when the distribution of the metal oxide is not parabolic along the radial direction, the molar concentration variation per appropriate interval is determined to obtain each concentration distribution gradient, from which each ratio of concentration distribution gradients is calculated. In this situation, if one or more of such concentration distribution gradient ratios are within the above ranges according to the present invention, the desired effects can be attained. For example, even when the concentration distribution of a metal oxide has either a profile which is flat around the center and exhibits a gradual decrease in the content of the metal oxide around the periphery as shown in FIG. 3 or a profile which is flat around the center and exhibits a gradual increase in the content of the metal oxide around the periphery as shown in FIG. 4, that is, even when the distribution of a metal oxide is of a fourth order or sixth order function, the desired effects can be obtained as long as the above ranges of dCf/dCg according to the present invention are at least partially satisfied by the optical element. Illustratively stated, the desired effects can be obtained irrespective of whether the ranges of dCf/dCg are satisfied by the optical element in its entirety as shown in FIG. 1 or in its portion as shown in FIGS. 3 and 4.

In the present invention, the metal species g and f have concentrations distributed in mutually reverse directions. Accordingly, the concentration distribution gradient ratio dCf/dCg takes a negative value. In order to simplify the following description of the present invention, the absolute value of the concentration distribution gradient ratio dCf/dCg is employed below. That is, |dCf/dCg| is employed.

Particular examples of radially gradient index optical elements according to the present invention may have either a distribution profile as shown in FIG. 1(a) in which the absolute amount of metal species g is largest at the center and nearly parabolically decreases toward the periphery while the absolute amount of metal species f is smallest at the center and nearly parabolically increases toward the periphery, or a distribution profile as shown in FIG. 1(b) in which the absolute amount of metal species g is smallest at the center and nearly parabolically increases toward the periphery while the absolute amount of metal species f is largest at the center and nearly parabolically decreases toward the periphery. Even if the metal species g selected from the metal group G and the metal species f selected from the metal groups F1 and F2 are distributed in reverse directions, an optical element having the desired distribution characteristics cannot be obtained when the ratio of the concentration distribution gradient of metal species f to that of metal species g falls outside the above ranges according to the present invention.

Figure 2:
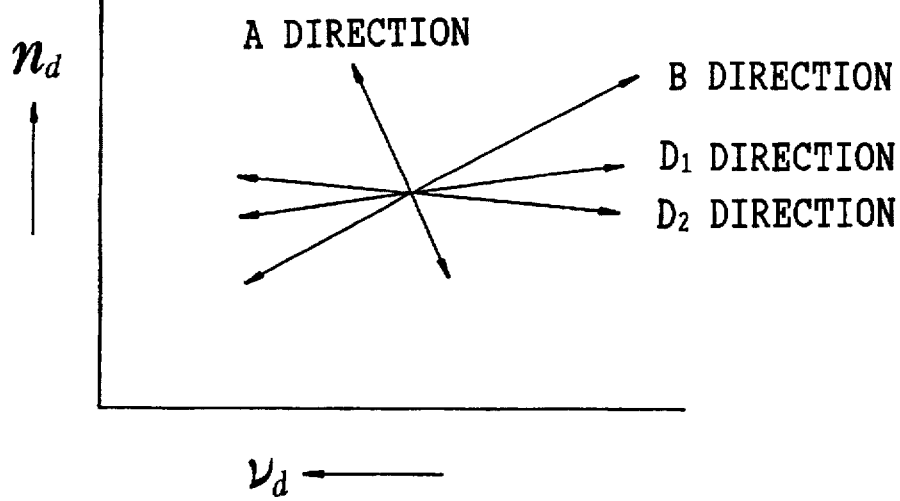
FIG. 2 is a diagram showing the relationship between the refractive index and the Abbe number for gradient index optical elements.

When the concentration distribution gradient dCg of metal species g is constant, a shift from the direction of line designated B DIRECTION to the directions of lines designated $D_1$ DIRECTION and $D_2$ DIRECTION on FIG. 2 may be attained by increasing the absolute value of the concentration distribution gradient of metal species f (|dCf|). Therefore, for attaining the distributions of $D_1$ and $D_2$ DIRECTIONS, it is requisite that the absolute value (|dCf|) be greater than a certain value. On the other hand, when the concentration distribution gradient dCf of metal species f is constant, a shift from the directions of lines designated $D_1$ DIRECTION and $D_2$ DIRECTION to the direction of line designated A DIRECTION to on FIG. 2 is caused by decreasing the absolute value of the concentration distribution gradient of metal species g (|dCg|). Therefore, for attaining the distributions of $D_1$ and $D_2$ DIRECTIONS, it is requisite that the absolute value (|dCg|) be greater than a certain value, i.e., that |dCf/dCg| be smaller than a certain value. The lower limit of the absolute value of the concentration distribution gradient of each of metal species f (|dCf|) and g (|dCg|) depends on the types and concentration distribution gradients of metal species f and g, so that generalization is difficult. However, with respect to each of the metal species f and g, it is requisite that the absolute value of the ratio of the concentration distribution gradient of metal species f to that of metal species g (|dCf/dCg|) be within the range shown in the following Table 1.

With respect to each specific combination of metal species g and f, it is preferred that the lower limit of the absolute value of the ratio of the concentration distribution gradient of metal species f to that of metal species g (|dCf/dCg|) be as indicated in the following Table 2.

An increase in the absolute value of the concentration distribution gradient ratio (|dCf/dCg|) shifts the distribution characteristics on FIG. 2 from $D_1$ DIRECTION to $D_2$ DIRECTION. With respect to each specific combination of metal species g and f, it is preferred that the upper limit of the absolute value of the ratio of the concentration distribution gradient of metal species f to that of metal species g (|dCf/dCg|) be as indicated in the following Table 3.

TABLE 1

Desirable Range of Absolute Value of Ratio of Concentration Distribution Gradient of Metal Species f to That of Metal Species g (|dCf/dCg|) with respect to Each Metal Species f

| Metal Species f | Lower Limit Value of |dCf/dCg| | Upper Limit Value of |dCf/dCg| |
|---|---|---|
| La, In, Y, Zr, Ta | $0.2 \leq$ | $\leq 4$ |
| Ga, Sn, Ba, Sr, Ca | $0.5 \leq$ | $\leq 7$ |

TABLE 2

Desirable Lower Limit of Absolute Value of Ratio of Concentration Distribution Gradient of Metal Species f to That of Metal Species g (|dCf/dCg|) with respect to Each Specific Combination of Metal Species g and f

| Metal Species g | Metal Species f | Lower Limit Value of |dCf/dCg| |
|---|---|---|
| Ta | Ca | $5.0 \leq$ |
| Nb | Ca | $3.0 \leq$ |
| Ta | Sr | |
| Nb | Sr | $2.5 \leq$ |
| Ta | Ba | |
| Nb | Ga | $2.0 \leq$ |
| Ta | Sn | |
| Nb | Sn, Zr, Ba | $1.5 \leq$ |
| Zr | Sr, Ca, Ga | |
| Nb, Ta | In, Y | $1.0 \leq$ |
| Tl | Ga, Ca | $0.7 \leq$ |
| Pb | Ga, Sr, Ca, Zr | |
| Nb | Ta | |
| Ta | La | |
| Zr | Ba, Sn | |
| Tl | Sn, Ba, Sr | $0.5 \leq$ |
| Pb | Y, Sn, Ba | |
| Ti | Ga, Sn, Ba, Sr, Ca | |
| Nb | La | |
| Zr | In, Y | |
| Tl, Ti | La, In, Y, Zr, Ta | $0.2 \leq$ |
| Zr | La | |
| Pb | La, In, Ta | |

TABLE 3

Desirable Upper Limit of Absolute Value of Ratio of Concentration Distribution Gradient of Metal Species f to That of Metal Species g (|dCf/dCg|) with respect to Each Specific Combination of Metal Species g and f

| Metal Species g | Metal Species f | Upper Limit Value of |dCf/dCg| |
|---|---|---|
| Ti | La, Ta | $\leq 0.7$ |
| Zr | La | |
| Pb | Ta | |
| Tl | Ta, La | $\leq 1.5$ |
| Ti | In, Y, Zr | |
| Pb | La, In, Y | |
| Zr | In, Y | |
| Tl | In, Y, Zr | $\leq 2.0$ |
| Ti | Sn | |
| Zr | Sn, Ba | |
| Pb | Sn, Zr | |
| Nb | La, Ta | |
| Ta | La, In | |
| Ti | Ba | $\leq 3.0$ |
| Nb | In, Y | |
| Ta | Y | |
| Zr | Ga | |
| Tl | Sn, Ba | $\leq 4.0$ |
| Ti | Ga, Sr, Ca | |
| Pb | Ga, Ba | |
| Zr | Sr, Ca | |
| Nb | Sn, Zr | |
| Tl | Ga, Sr, Ca | $\leq 5.0$ |
| Pb | Sr, Ca | |
| Nb | Ba | |
| Ta | Sn, Ba | |
| Nb | Ga, Sr, Ca | $\leq 6.0$ |
| Ta | Sr, Ca | $\leq 7.0$ |

At least two metal species g may be selected from the metal group G, and at least two metal species f may be selected from the metal group F1 or F2. In this case, the metal oxide contents are totaled within each of the metal groups to obtain total contents Cf and Cg, from which dCf and dCg are calculated. The resultant dCf and dCg are applied to Tables 1 to 3. When a plurality of metal species selected are included in different columns of each of the tables, it is preferred that the concentration distribution gradient ratio in the lowermost column be applied.

The gradient index optical element comprises metal oxides each having concentrations distributed at a gradient, so that not only the refractive index and Abbe number but also the coefficient of thermal expansion is distributed at a gradient. In practice, an additive, such as K and Na, is added to cope with the gradient of the coefficient of thermal expansion. Such an additive is less contributory to the refractive index and Abbe number, so that it is not necessary to consider the effect thereof in an optical designing of the gradient index optical element according to the present invention. The gradient index optical element of the present invention, comprising the additive, such as K and Na, for the above purpose exhibits optical characteristics along the directions of lines designated $D_1$ DIRECTION and $D_2$ DIRECTION on FIG. 2, and thus is excellent in aberration correctability.

The gradient index optical element of the present invention, in which the combination of metal species g and f and their distribution ratios have appropriately been determined as described above, in its entirety or portion exhibits a ratio of $\Delta n_d/\Delta v_d$, in which $\Delta n_d$ and $\Delta v_d$ represent a refractive index difference and an Abbe number difference of the element, respectively, ranging from −0.004 to 0.0034, said $\Delta n_d$ satisfying the relationship: $|\Delta n_d| \leq 0.02$. Therefore, the Abbe number difference is great relative to the refractive index difference, so that the optical element of the present invention is one suitable from the viewpoint of correcting chromatic aberration when having been applied to various optical systems. The smaller the absolute value of the above ratio of $\Delta n_d/\Delta v_d$, the more excellent the performance of the optical element. It is preferred that the ratio of $\Delta n_d/\Delta v_d$ range from −0.0033 to 0.0025, especially from −0.0025 to 0.0025.

PREFERRED EMBODIMENT OF THE INVENTION

The present invention will now be described in greater detail with reference to the following Examples, which should not be construed as limiting the scope of the present invention.

In the following Examples, the indicated values of content are those converted by the following metal oxide conversion method.

In the method, (1) with respect to each of metal species, including Si, the content mol % is measured in terms of metal oxide at predetermined positions of the gradient index optical element;

(2) the position M where the content of metal species g is largest is determined, and, at the position M, the total of metal oxide contents is set at 100 mol %;

(3) the value of content of any metal oxides other than those of metal species f and g at the position M is also employed in place of measured value throughout the radial direction of the gradient index optical element; and (4) due conversion according to the above employment of the value at the position M is effected for the contents of metal species f and g (as a result, frequently, the total content is not 100 mol %).

For clarity, the conversion method is illustrated below by means of an example (as in Example 6).

(1) at the position M, the measured contents are 85 mol % $SiO_2$, 10 mol % PbO and 5 mol % BaO, while at another position, the measured contents are 80.9 mol % $SiO_2$, 4.8 mol % PbO and 14.3 mol % BaO;

(2) noting that Pb is a metal species g and Ba is a metal species f, the value of content of 85 mol % for Si is employed in place of measured value throughout the radial direction of the gradient index optical element; and (3) due conversion is effected for the contents of PbO and BaO according to the employment of the value of 85 mol % for $SiO_2$, as follows.

80.9 mol % $SiO_2$, 4.8 mol % PbO and 14.3 mol % BaO is converted to 85 mol % $SiO_2$, 5.0 (=4.8×85/80.9) mol % PbO and 15.0 (=14.3×85/80.9) mol % BaO.

EXAMPLE 1

A gradient index optical element comprising $SiO_2$, PbO and $Y_2O_3$ in respective mol % proportions of 70, 20 and 10 at the center and in respective mol % proportions of 70, 10 and 17 at the periphery, in which the content of PbO nearly parabolically decreased from the center toward the periphery while the content of $Y_2O_3$ nearly parabolically increased from the center toward the periphery, was produced by the sol-gel method as described in U.S. Pat. No. 5,171,344. The thus produced gradient index optical element had a refractive index ($n_d$) of 1.701 and an Abbe number ($v_d$) of 35.5 at the center and a refractive index ($n_d$) of 1.686 and an Abbe number ($v_d$) of 42.4 at the periphery. Thus, the refractive index difference $\Delta n_d$ (refractive index at the periphery minus that at the center) was −0.015, and the Abbe number difference $\Delta v_d$ (Abbe number at the periphery minus that at the center) was 6.9. Therefore, a distribution along the direction of line designated D1 DIRECTION on the $n_d$-$v_d$ diagram of FIG. 2 was obtained, and hence the gradient index optical element was found to be effective in chromatic aberration correction.

EXAMPLES 2–6

A single metal species g was selected from the metal group G, and a single metal species f was selected from the metal group F1 or F2. Gradient index optical elements having the contents at the center and at the periphery as shown in Table 4, in which the metal species g and f had nearly parabolic, mutually reverse concentration distributions between the center and the periphery, were produced as in Example 1, and optical characteristics were evaluated. The concentration distribution gradient ratios dCf/dCg fell within the appropriate ranges indicated in Tables 2 and 3.

TABLE 4

Relationship between Metal Oxide Combination and Optical Characteristics

| | | Si | G | | F | | Optical Characteristics | | | Ratio of Conc. Distribution Gradient |
|---|---|---|---|---|---|---|---|---|---|---|
| | | Content | Metal | Content | Metal | Content | $\Delta n_d$ | $\Delta v_d$ | $\Delta n_d/\Delta v_d$ | ldCf/dCgl |
| Example 1 | Center | 70 | Pb | 20 | Y | 10 | −0.015 | 6.9 | −0.0022 | 0.7 |
| | Periphery | 70 | Pb | 10 | Y | 17 | | | | |
| Example 2 | Center | 80 | Ti | 10 | Ba | 10 | −0.030 | 16.3 | −0.0018 | 0.8 |
| | Periphery | 80 | Ti | 0 | Ba | 18 | | | | |
| Example 3 | Center | 85 | Ta | 10 | Sr | 0 | −0.015 | 6.1 | −0.0025 | 4 |
| | Periphery | 85 | Ta | 5 | Sr | 20 | | | | |
| Example 4 | Center | 90 | Nb | 10 | Zr | 0 | −0.006 | 3.5 | −0.0017 | 2.4 |
| | Periphery | 90 | Nb | 5 | Zr | 12 | | | | |
| Example 5 | Center | 88 | Tl | 0 | Ca | 20 | 0.024 | −10.1 | −0.0024 | 2 |
| | Periphery | 88 | Tl | 12 | Ca | 0 | | | | |
| Example 6 | Center | 85 | Pb | 10 | Ba | 5 | −0.008 | −6.5 | 0.0012 | 2 |
| | Periphery | 85 | Pb | 5 | Ba | 15 | | | | |

Note
(1) $\Delta n_d$ and $\Delta v_d$ mean refractive index difference and Abbe number difference, respectively.
(2) dCf and dCg mean the concentration distribution gradient of metal species f and that of metal species g, respectively.
(3) The values of content are those converted by the metal oxide conversion method described hereinbefore.

With respect to the optical characteristics of Table 4, the negative sign for $\Delta n_d$ indicates that the refractive index distribution of the gradient index optical element has a protrudent profile exhibiting the highest value at the center, while the positive sign for $\Delta n_d$ indicates that the refractive index distribution has a recessed profile exhibiting the lowest value at the center.

The ratio of $\Delta n_d$ to $\Delta v_d$ being small and the sign of the product of $\Delta n_d$ and $\Delta v_d$ being negative indicate that the distribution characteristics of the obtained gradient index optical element are along the direction of line designated D1 DIRECTION on FIG. 2. On the other hand, the sign of the product of $\Delta n_d$ and $\Delta v_d$ being positive indicates that the distribution characteristics of the obtained gradient index optical element are along the direction of line designated D2

DIRECTION on FIG. 2. Accordingly, the relevant gradient index optical elements were found to be effective in chromatic aberration correction.

EXAMPLES 7-9

Instead of selecting a single metal species as in the above Examples, a single or a plurality of metal species were selected from each metal group. Gradient index optical elements having the contents at the center and at the periphery as shown in Table 5, in which the content of the metal species g nearly parabolically decreased from the center toward the periphery while the content of the metal species f nearly parabolically increased from the center toward the periphery, were produced as in Example 1, and optical characteristics were evaluated. All the gradient index optical elements were found to be effective in chromatic aberration correction.

expressed by a high order function, was produced as in Example 1. In Table 6 and FIG. 4, points B and C are trisectors of the radius AD. The concentration distribution gradient ratios dCf/dCg were 5, 2.67 and 0.47 between points A and B, B and C, and C and D, respectively. Namely, the concentration distribution gradient ratio fell outside the range according to the present invention between points A and B, where, as apparent from the value of $\Delta n_d/\Delta v_d$, the optical characteristics were along the direction of line designated A DIRECTION on FIG. 2. However, between points C and D, the concentration distribution gradient ratio fell within the range according to the present invention and the optical characteristics were along direction of line designated $D_2$ DIRECTION on FIG. 2. The gradient index optical element in which the concentration distribution gradient ratio fell within the range according to the present invention only at a portion thereof, was also found to have excellent optical characteristics.

TABLE 5

Relationship between Metal Oxide Combination and Optical Charactenristics

| | | Si | G | | F | | Optical Characteristics | | | Ratio of Conc. Distribution Gradient |
|---|---|---|---|---|---|---|---|---|---|---|
| | | Content | Metal | Content | Metal | Content | $\Delta n_d$ | $\Delta v_d$ | $\Delta n_d/\Delta v_d$ | |dCf/dCg| |
| Example 7 | Center | 85 | Pb | 10 | Ba | 0 | −0.002 | 9.5 | −0.0002 | 1.67 |
| | | | Nb | 5 | | | | | | |
| | Periphery | 85 | Pb | 0 | Ba | 20 | | | | |
| | | | Nb | 3 | | | | | | |
| Example 8 | Center | 86 | Ti | 10 | Y | 4 | −0.018 | 13.2 | −0.0014 | 1.0 |
| | | | | | Ba | 0 | | | | |
| | Periphery | 86 | Ti | 3 | Y | 8 | | | | |
| | | | | | Ba | 3 | | | | |
| Example 9 | Center | 75 | Tl | 15 | La | 2 | −0.024 | 11.0 | −0.0022 | 0.75 |
| | | | Ti | 5 | Sn | 3 | | | | |
| | Periphery | 75 | Tl | 5 | La | 8 | | | | |
| | | | Ti | 3 | Sn | 6 | | | | |

Note
(1) $\Delta n_d$ and $\Delta v_d$ mean refractive index difference and Abbe number difference, respectively.
(2) dCf and dCg mean the concentration distribution gradient of metal species f and that of metal species g, respectively.
(3) The values of content are those converted by the metal oxide conversion method described hereinbefore.

EXAMPLE 10

A gradient index optical element having the metal oxide content distribution shown in Table 6 and FIG. 4, as

TABLE 6

Relationship between Metal Oxide Proportion and Optical Characteristics

| | Position from Center | g | f | | Optical Characteristics | | | Ratio of Concentration Distribution Gradient |
|---|---|---|---|---|---|---|---|---|
| | | $SiO_2$ | $TiO_2$ | $La_2O_3$ | $\Delta n_d$ | $\Delta v_d$ | $\Delta n_d/\Delta v_d$ | dCf/dCg |
| A | 0 | 81 | 4.6 | 16 | | | | |
| | | | | | −0.016 | −0.1 | 0.16 | 5 |
| B | ⅓ | 81 | 5 | 14 | | | | |
| | | | | | −0.031 | −0.9 | 0.034 | 2.67 |
| C | ⅔ | 81 | 6.5 | 10 | | | | |
| | | | | | −0.006 | −7.7 | 0.00078 | 0.47 |
| D | 1 | 81 | 15 | 4 | | | | |

Note
(1) $\Delta n_d$ and $\Delta v_d$ mean refractive index difference and Abbe number difference, respectively.
(2) dCf and dCg mean the concentration distribution gradient of metal species f and that of metal species g, respectively.

In all the above Examples, the gradient index optical elements had radially gradient index distribution profiles. Naturally, however, the present invention is also applicable to axially gradient index optical elements with the result that desired effects are obtained.

What is claimed is:

1. A gradient index optical element comprising at least one metal species g selected from the metal group G consisting of Nb, Ta, Pb, Ti, Tl and Zr and at least one metal species f selected from the metal group F1 consisting of La, In, Y, Zr and Ta, said metal species g and f being not simultaneously Ta or Zr, said metal species g and f having concentrations distributed in mutually reverse directions, wherein said element in its entirety or portion exhibits a ratio of dCf/dCg, in which dCf and dCg represent concentration distribution gradients of metal species f and g, respectively, ranging from −4 to −0.2, and wherein said element in its entirety or portion exhibits a ratio of $\Delta n_d/\Delta v_d$, in which $\Delta n_d$ and $\Delta v_d$ represent a refractive index difference and an Abbe number difference of the element, respectively, ranging from −0.004 to 0.0034, said $\Delta n_d$ satisfying the relationship:

$|\Delta n_3| \leq 0.02$.

2. The gradient index optical element according to claim 1, wherein said ratio of $\Delta n_d/\Delta v_d$ ranges from −0.0033 to 0.0025.

3. The gradient index optical element according to claim 1, wherein said ratio of $\Delta n_d/\Delta v_d$ ranges from −0.0025 to 0.0025.

4. The gradient index optical element according to claim 1, 2 or 3, wherein said metal species f is selected from La, In and Y.

5. The gradient index optical element according to claim 1, 2 or 3, wherein said metal species g is selected from Nb, Pb, Ti and Tl.

6. The gradient index optical element according to claim 1, 2 or 3, wherein said metal species g is selected from Pb, Ti and Tl, and said dCf/dCg is in the range of from −2 to −0.2.

7. The gradient index optical element according to claim 1, 2 or 3, wherein said metal species g is Zr, said metal species f is selected from La, In and Y, and said dCf/dCg is in the range of from −1.5 to −0.2.

8. The gradient index optical element according to claim 1, 2 or 3, wherein said metal species g is Ta, said metal species f is selected from La, In, Y and Zr, and said dCf/dCg is in the range of from −3 to −0.7.

9. The gradient index optical element according to claim 1, 2 or 3, wherein said metal species g is Nb, said metal species f is selected from La, In, Y, Zr and Ta, and said dCf/dCg is in the range of from −4 to −0.5.

10. A gradient index optical element comprising at least one metal species g selected from the metal group G consisting of Nb, Ta, Pb, Ti, Tl and Zr and at least one metal species f selected from the metal group F2 consisting of Ga, Sn, Ba, Sr and Ca, said metal species g and f having concentrations distributed in mutually reverse directions, wherein said element in its entirety or portion exhibits a ratio of dCf/dCg, in which dCf and dCg represent concentration distribution gradients of metal species f and g, respectively, ranging from −7 to −0.5, and wherein said element in its entirety or portion exhibits a ratio of $\Delta n_d/\Delta v_d$, in which $\Delta n_d$ and $\Delta v_d$ represent a refractive index difference and an Abbe number difference of the element, respectively, ranging from −0.004 to 0.0034, said $\Delta n_d$ satisfying the relationship:

$|\Delta n_d| \leq 0.02$.

11. The gradient index optical element according to claim 10, wherein said ratio of $\Delta n_d/\Delta v_d$ ranges from −0.0033 to 0.0025.

12. The gradient index optical element according to claim 10, wherein said ratio of $\Delta n_d/\Delta v_d$ ranges from −0.0025 to 0.0025.

13. The gradient index optical element according to claim 10, 11 or 12, wherein said metal species g is selected from Pb, Ti and Tl, and said dCf/dCg is in the range of from −5 to −0.5.

14. The gradient index optical element according to claim 10, 11 or 12, wherein said metal species g is Zr, and said dCf/dCg is in the range of from −4 to −0.7.

15. The gradient index optical element according to claim 10, 11 or 12, wherein said metal species g is selected from Nb and Ta, and said dCf/dCg is in the range of from −4 to −1.5.

* * * * *